United States Patent
Matsuoka

(10) Patent No.: US 7,535,580 B2
(45) Date of Patent: May 19, 2009

(54) IMAGE FORMING APPARATUS AND IMAGE FORMING METHOD

(75) Inventor: Nobuo Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 11/737,741

(22) Filed: Apr. 19, 2007

(65) Prior Publication Data
US 2007/0247636 A1 Oct. 25, 2007

(30) Foreign Application Priority Data
Apr. 20, 2006 (JP) .............................. 2006-116514

(51) Int. Cl.
*G01B 11/02* (2006.01)
*G01P 3/36* (2006.01)

(52) U.S. Cl. ...................... 356/498; 356/28.5
(58) Field of Classification Search ................. 356/28, 356/28.5, 496, 498
See application file for complete search history.

(56) References Cited

U.S. PATENT DOCUMENTS

| 4,875,769 | A * | 10/1989 | Linebarger | 356/28 |
| 5,636,014 | A * | 6/1997 | Hanson | 356/28 |
| 6,388,744 | B1 * | 5/2002 | Kubota et al. | 356/237.3 |
| 7,382,443 | B2 * | 6/2008 | Ohtomo et al. | 356/4.01 |
| 2007/0237588 | A1 * | 10/2007 | Russell | 407/11 |

FOREIGN PATENT DOCUMENTS

| JP | 06-327278 A | 11/1994 |
| JP | 3259440 B2 | 12/2001 |

* cited by examiner

*Primary Examiner*—Michael A Lyons
(74) *Attorney, Agent, or Firm*—Rossi, Kimms & McDowell, LLP

(57) ABSTRACT

An image forming apparatus which can form an even image while maintaining high resolution. A speckle pattern detecting unit detects a speckle pattern on a surface of a photosensitive drum. A motor drive circuit controls the rotational speed of the photosensitive drum based on the detected speckle pattern on the surface of the photosensitive drum detected by the speckle pattern detecting unit.

12 Claims, 7 Drawing Sheets

IMAGE FORMING APPARATUS AND IMAGE FORMING METHOD

BACKGROUND OF THE INVENTION

1. Field of the Invention

The present invention relates to an image forming apparatus and an image forming method, and more particularly to an image forming apparatus and an image forming method which control an electrostatic latent image to be formed on a photosensitive member.

2. Description of the Related Art

In recent years, the resolution of electrophotographic image forming apparatuses has increased to 400 pdi (63.5-μm dot pitch), 600 pdi (42.3-μm dot pitch), and 1200 pdi (21.1-μm dot pitch), and most recently, image forming apparatuses offering a high resolution of 2400 pdi (10.6-μm dot pitch), which was offered in the past by printing machines, have emerged.

With the increase in resolution, there has been a growing demand for image forming apparatuses which can write an image on a photosensitive member with high positional accuracy.

For example, at a low resolution of 600 pdi, the dot pitch width (the size of one dot) is as wide (large) as 42.3 μm. Here, assume that a variation in the rotational speed of the photosensitive member (variation in the rotational speed), a variation in the scanning pitch of a laser scanner (variation in the intervals of scanning lines in the sub scanning direction), or a displacement (shift) of an image caused by a change in the relative mounting positions of the photosensitive member and the laser scanner is 10 μm. In this case, the percentage of the displacement relative to the dot pitch width 42.3-μm is 25%, and unevenness in an image is inconspicuous and within an allowance. At a high resolution of 2400 pdi, however, the dot pitch width (the size of one dot) is 10.6 μm. Thus, if an image is displaced 10 μm, the percentage of the displacement relative to the dot pitch width is approximately 100%, and an image is displaced by one pixel or one scanning line to cause an overlap. Thus, there is the problem that a great unevenness of an image occurs due to the impossibility to ensure image uniformity as well as displacement of thin-lined edges.

On the other hand, it has been conventionally thought that an even image can be formed by detecting a displacement as described above and suitably controlling the apparatus according to the detected variation.

For example, there has been proposed an image forming apparatus in which an encoder provided on a rotary shaft of a photosensitive member detects the rotational angular velocity of the photosensitive member, and the rotational speed or the like of the photosensitive member is controlled in accordance with the detected angular velocity (see e.g. Japanese Patent No. 3259440).

However, with the above conventional image forming apparatus in which the encoder provided on the rotary shaft of the photosensitive member detects the rotational angular velocity of the photosensitive member, only the angular velocity of the photosensitive member can be detected, and the moving speed of the surface of the photosensitive member on which attention should be originally focused cannot be detected. Specifically, in a case where the surface of the photosensitive member deflects from the rotation axis of the photosensitive member or in a case where the surface of the photosensitive member itself is distorted, it is difficult to detect a variation in the moving speed of the surface of the photosensitive member. For this reason, with the conventional image forming apparatus, it is impossible to prevent image displacement caused by a variation in the moving speed of the surface of the photosensitive member even if the rotational speed or the like of the photosensitive member is controlled in accordance with the angular velocity. Therefore, it is impossible to form an even image while maintaining high resolution.

SUMMARY OF THE INVENTION

The present invention provides an image forming apparatus and an image forming method which can form an even image while maintaining high resolution.

To attain the above object, in a first aspect of the present invention, there is provided an image forming apparatus comprising an image bearing member, a speckle pattern detecting unit adapted to detect a speckle pattern on a surface of the image bearing member, and a drive control unit adapted to control a rotational speed of the image bearing member based on the speckle pattern of the surface of the image bearing member detected by the speckle pattern detecting unit.

The image forming apparatus further comprises a laser scanner adapted to irradiate a laser beam in a main scanning direction onto the surface of the image bearing member and expose the surface of the image bearing member to the laser beam to form an electrostatic latent image, and a movement amount detecting unit adapted to detect a movement amount of the speckle pattern detected by the speckle pattern detecting unit, and the drive control unit is adapted to control the rotational speed of the image bearing member according to the movement amount of the speckle pattern detected by the movement amount detecting unit.

The image forming apparatus further comprises an optical path control unit adapted to control an optical path of the laser beam according to the movement amount of the speckle pattern detected by the movement amount detecting unit.

The speckle pattern detecting unit is disposed outside the laser scanner.

The speckle pattern detecting unit is disposed inside the laser scanner.

The speckle pattern on the surface of the image bearing member detected by the speckle pattern detecting unit is formed by the laser beam irradiated by the laser scanner.

The speckle pattern on the surface of the image bearing member comprises a speckle pattern in a non-image area or non-development area of the image bearing member.

To attain the above object, in a second aspect of the present invention, there is provided an image forming method comprising a speckle pattern detecting step of detecting a speckle pattern on a surface of an image bearing member, and a drive control step of controlling a rotational speed of the image bearing member based on the speckle pattern of the surface of the image bearing member detected in the speckle pattern detecting step.

The image forming method further comprises a laser scanning step of irradiating a laser beam in a main scanning direction onto the surface of the image bearing member and exposing the surface of the image bearing member to the laser beam to form an electrostatic latent image, and a movement amount detecting step of detecting a movement amount of the speckle pattern detected in the speckle pattern detecting step, and in the drive control step, the rotational speed of the image bearing member is controlled according to the movement amount of the speckle pattern detected in the movement amount detecting step.

The image forming method further comprises an optical path control step of controlling an optical path of the laser beam according to the movement amount of the speckle pattern detected in the movement amount detecting step.

The speckle pattern on the surface of the image bearing member detected in the speckle pattern detecting step is formed by the laser beam irradiated in the laser scanning step.

The speckle pattern on the surface of the image bearing member comprises a speckle pattern in a non-image area or non-development area of the image bearing member.

According to the present invention, a speckle pattern on the surface of the image bearing member is detected, and the rotational speed of the image bearing member is controlled based on the detected speckle pattern on the surface of the image bearing member. Since the detected speckle pattern lies on the surface of the image bearing member, the moving speed of the surface of the image bearing member can be detected based on the speckle pattern. For this reason, an electrostatic latent image, or in other words, the position at which an electrostatic latent image is formed can be controlled according to the moving speed of the surface of the image bearing member. Thus, a minute change in the moving speed of the surface of the image bearing member can be detected even in a case where the surface of the image bearing member deflects from the rotation axis of the image bearing member, or in a case where the surface of the image bearing member itself is distorted. By suitably controlling the apparatus in response to the detected minute variation in the moving speed of the surface of the image bearing member, it is possible to form an even image while maintaining high resolution.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
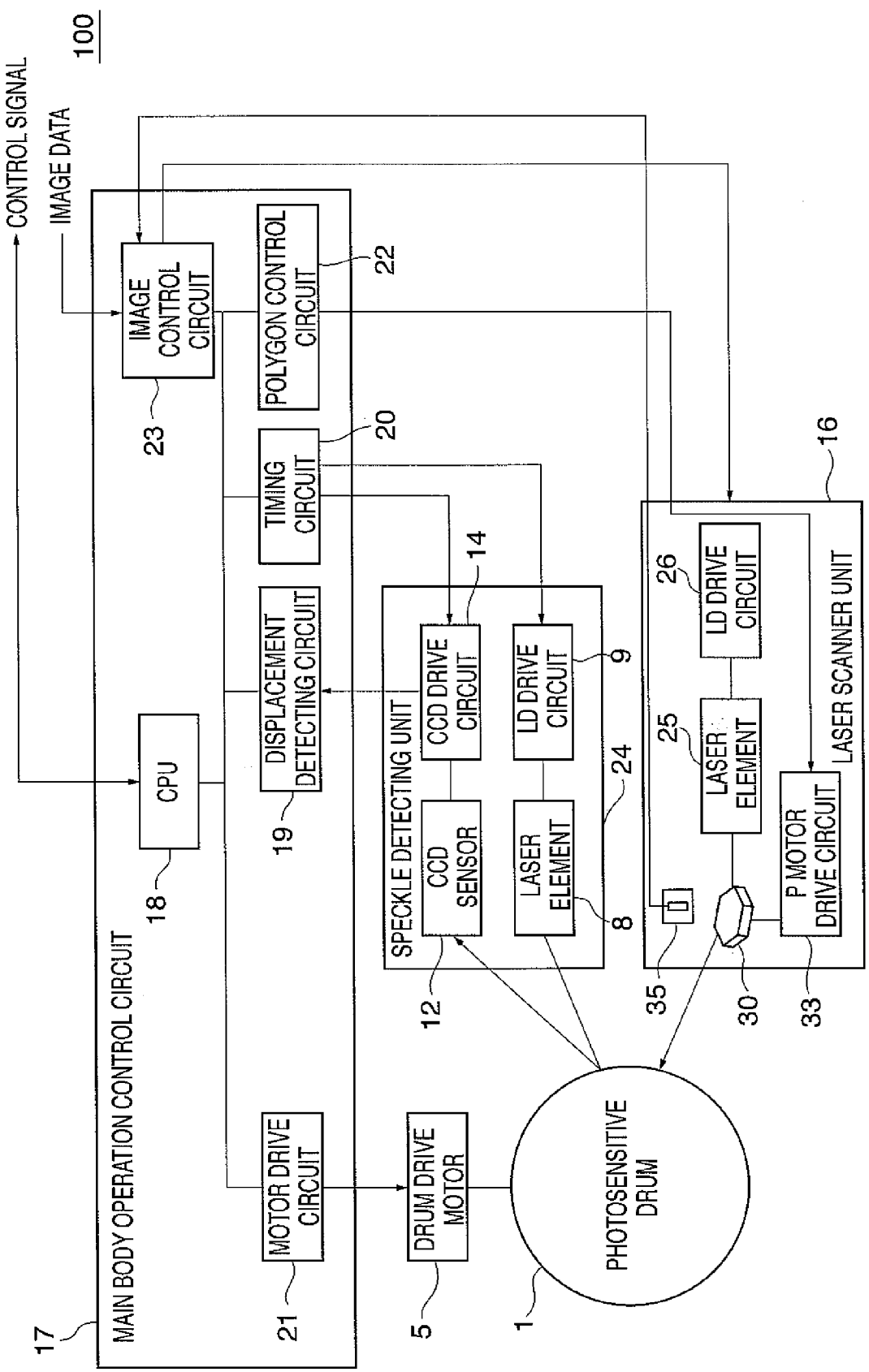
FIG. 1 is a schematic block diagram of the construction of an image forming apparatus according to a first embodiment of the present invention.
Figure 2:
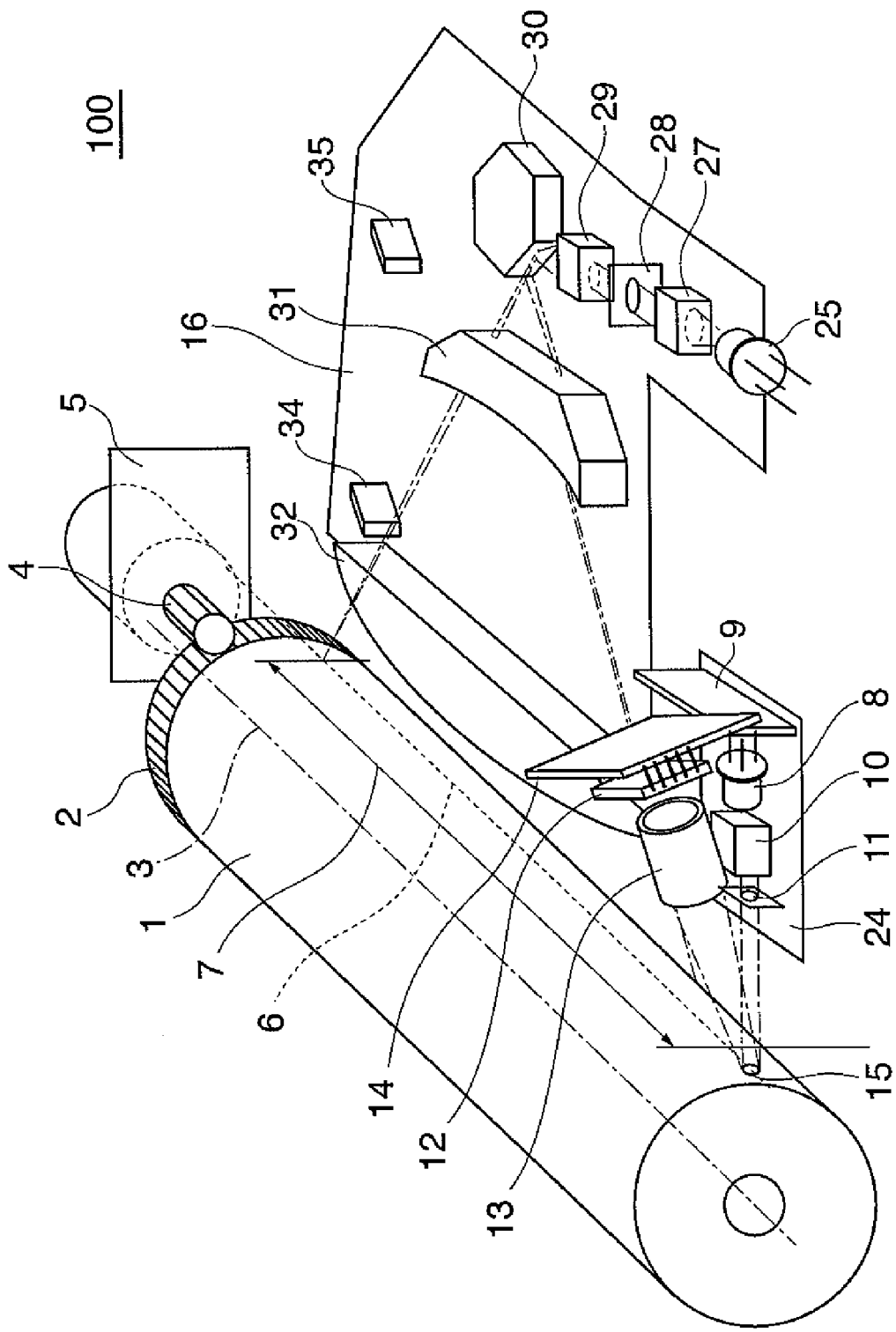
FIG. 2 is a partial perspective view of the essential parts of the image forming apparatus in FIG. 1.

First, a description will be given of an image forming apparatus according to a first embodiment of the present invention. FIG. 1 is a schematic block diagram of the construction of an image forming apparatus 100 according to the first embodiment. FIG. 2 is a partial perspective view of the essential parts of the image forming apparatus 100.

As shown in FIG. 1, the image forming apparatus 100 is comprised of a photosensitive drum 1 (image bearing member) which is an electrostatic latent image carrier, a drum drive motor 5 that rotatively drives the photosensitive drum 1, a laser scanner unit 16 that outputs a laser beam to scan the photosensitive drum to form an electrostatic latent image on the photosensitive drum 1, and a main body operation control circuit 17 that controls components elements of the image forming apparatus 100. The image forming apparatus 100 is also comprised of a speckle detecting unit 24 for detecting a speckle pattern on the surface of the photosensitive drum 1.

As shown in FIG. 2, the photosensitive drum 1 is pivotally supported by a main body, not shown, of the image forming apparatus 100 such that it pivots on a flange shaft 3. A flange gear 2 is formed along the perimeter of an end of the photosensitive drum 1, which is connected to the drum drive motor 5 via the flange gear 2 and the drum drive gear 4. The drum drive gear 4 is mounted on the rotary shaft of the drum drive motor 5. With this arrangement, when the drum drive motor 5 rotates, the torque of the drum drive motor 5 is transmitted to the flange gear 2 via the drum drive gear 4, whereby the photosensitive drum 1 rotates.

As shown in FIG. 2, a laser beam for forming an electrostatic latent image is output from the laser scanner unit 16 to scan a main scanning line 6 of the photosensitive drum 1. Also, on the photosensitive drum 1, an output image (electrostatic latent image and toner image) is formed in a main scanning effective image area 7 including the main scanning line 6.

As shown in FIGS. 1 and 2, the laser scanner unit 16 is comprised of a laser element 25, a laser drive circuit 26, a collimator lens 27, a shape slit 28, a cylindrical lens 29, a polygon scanner 30, a cylindrical lens 31, an f-θ lens 32, and a polygon (P) motor drive circuit 33. The laser scanner unit 16 is also comprised of a BD mirror 34 and a main scanning position sensor 35.

The laser element 25 is a scanning light source for outputting laser light and scanning the photosensitive drum 1 to form an electrostatic latent image thereon. The laser element 25 is driven by the laser drive circuit 26. The collimator lens 27 causes laser light, which is coherent dispersed light emitted from the laser element 25, to converge into parallel light. The shape slit 28 adapts the laser light, which has become the coherent parallel light, to the shape of an opening that limits unnecessary peripheral light from the laser light bundle and guides the resulting laser light bundle to the reflection surface of the polygon scanner 30 and guides the same to the cylindrical lens 29. The cylindrical lens 29 causes the light, which has passed through the shape slit 28, to converge in the sub scanning direction and the main scanning direction and guides the same to the polygon scanner 30.

The polygon scanner 30 causes the light, which has been caused to converge by the cylindrical lens 29, to scan the photosensitive drum 1 in the main scanning direction along the main scanning line 6 via the cylindrical lens 31 and the f-θ lens 32. The polygon scanner 30 is rotated by a polygon motor, not shown, which is drivingly controlled by the polygon motor drive circuit 33. The cylindrical lens 31 causes the light deflected in the main scanning direction by the polygon scanner 30 to more uniformly converge in the main scanning direction. The f-θ lens 32 receives the light output from the cylindrical lens 31 and causes the same to further converge in the main scanning direction and the sub scanning direction.

The f-θ lens 32 also converts equiangular scanning by the polygon scanner 30 into equiangular scanning along the main scanning line 6.

The BD mirror 34 picks up laser light falling outside the effective image area 7 of the photosensitive drum 1. The main scanning position sensor 35 receives the laser light picked up by the BD mirror 34 and detects the timing of passage of the focused beam (main scanning light).

As shown in FIGS. 1 and 2, the speckle detecting unit 24 (speckle pattern detecting section) is comprised of a laser element 8, a laser drive circuit 9, a collimator lens 10, a slit plate 11, a CCD sensor 12, an image-forming lens 13, and a CCD drive circuit 14, which are configured as an integral unit.

In the speckle detecting unit 24, the laser element 8 outputs laser light for generating a speckle pattern on the surface of the photosensitive drum 1. The laser element 8 is drivingly controlled by the laser drive circuit 9. The laser drive circuit 9 causes the laser element 8 to light up in a stable manner. The collimator lens 10 causes laser light, which is coherent dispersed light emitted from the laser element 8, to converge into parallel light. The slit plate 11 is provided so that an area in which the parallel light from the collimator lens 10 irradiates the photosensitive drum 1 (hereinafter referred to as "irradiation spot") can have a suitable shape. As shown in FIG. 2, laser light from the laser element 8 irradiates an area including the main scanning line 6 of the photosensitive drum 1 and outside the main scanning effective image area 7 to form an irradiation spot 15 via the collimator lens 10 and the slit plate 11. Although it is assumed here that the position at which the irradiation spot 15 is formed lies in a non-image area outside the effective image area 7, the irradiation spot 15 may be formed in an area inside the effective image area 7 insofar as this area is a non-image area where no toner image is formed.

Also, in the speckle detecting unit 24, the image-forming lens 13 causes reflected light from the irradiation spot 15 to form an image on a photo-receptive surface of the CCD sensor 12. Specifically, the image-forming lens 13 forms on the CCD sensor 12 an image of a speckle pattern in the irradiation spot 15 of the surface of the photosensitive drum 1. The CCD sensor 12 detects the formed image of the speckle pattern. The CCD drive circuit 14 drives the CCD sensor 12 and also processes outputs from the CCD sensor 12.

As shown in FIG. 1, the main body operation drive circuit 17 is comprised of a CPU 18, a displacement detecting circuit 19, a timing circuit 20, a motor drive circuit 21, a polygon control circuit 22, and an image control circuit 23.

A description will now be given of a speckle pattern. For example, when laser light, which is collimated coherent light, is irradiated onto the surface of the photosensitive drum 1, the laser light impinges upon microscopic asperities on the surface of the photosensitive drum 1, and reflected light rays with different phases interfere with each other, whereby a speckle pattern comprised of speckles can be seen.

In an area where uniform collimated light is irradiated, the speckle pattern reflects the asperities unique to the irradiated surface of the photosensitive drum 1 and is characterized by moving with the irradiated surface. In other words, by tracing the speckle pattern, the moving state of the photosensitive drum 1 can be detected.

As an example of method to detect a speckle pattern, there is a method in which a CCD sensor is used. With this method, it is possible to capture the movement of a speckle pattern with high accuracy when the speckle pattern moves only in a line direction of the CCD linear sensor. When a speckle pattern moves in two-dimensional directions, a pattern detection method using a CCD area sensor is effective.

Referring again to FIG. 1, the CPU 18 of the main body operation control circuit 17 controls the component elements of the main body operation control circuit 17. The displacement detecting circuit 19 receives speckle pattern data indicative of a speckle pattern on the surface of the photosensitive drum 1 detected by the CCD sensor 12 from the CCD drive circuit 14, and as will be described later, detects the shift amount (movement amount) of the speckle pattern in real time at intervals of sampling periods. The timing circuit 20 operates in synchronization with operation of the image forming apparatus 100 to generate drive pulses required to operate the laser drive circuit 9 and the CCD drive circuit 14. The motor drive circuit 21 (drive control unit) controls the rotational speed of the photosensitive drum 1 based on the speckle pattern on the surface of the photosensitive drum 1 detected by the speckle detecting unit 24. The motor drive circuit 21 supplies driving current to the drum drive motor 5 so that the surface of the photosensitive drum 1 can move at a fixed speed. The polygon control circuit 22 controls the polygon motor drive circuit 33, which drivingly controls a polygon drive motor, not shown, of the polygon scanner 30 of the laser scanner unit 16. The image control circuit 23 generates image data so as to output an image of which formation has been instructed by a host apparatus such as a host computer communicably connected to the image forming apparatus 100, outputs the generated image data to the laser drive circuit 26, and controls laser light output from the laser element 25 of the laser scanner unit 16.

Next, a description will be given of the operation of the image forming apparatus 100 constructed as described above.

Upon receiving an image formation instruction signal that instructs the formation of an image from the host apparatus, the CPU 18 of the main body operation control circuit 17 starts driving the image control circuit 23 and the polygon control circuit 22. Also, the CPU 18 instructs the motor drive circuit 21 to drive the drum drive motor 5. Further, to detect the moving speed of the surface of the photosensitive drum 1, the CPU 18 causes the timing circuit 20 to send a drive pulse to the CCD drive circuit 14 of the speckle detecting unit 24 to put the CCD sensor 12 in readiness for a reading operation.

The CPU 18 then causes the timing circuit 20 to output a drive pulse for activating the laser drive circuit 9 and turn on the laser element 8 which is the speckle light source. As a result, laser light from the laser element 8 is irradiated onto the surface (irradiation spot 15) of the photosensitive drum 1, and a speckle pattern in the irradiation spot 15 forms an image on the photo-receptive surface of the CCD sensor 12 via the image-forming lens 13. The formed image of the speckle pattern is detected by the CCD sensor 12, and speckle pattern data of the detected speckle pattern is output to the displacement detecting circuit 19 via a speckle signal output line, not shown, by the CCD drive circuit 14.

The displacement detecting circuit 19 then detects a specific pattern from the detected speckle pattern using a labeling method or the like and detects the displacement of the specific pattern in the rotational direction of the photosensitive drum 1 at intervals of a predetermined period. A concrete description will now be given of the operation of the displacement detecting circuit 19.

Figure 3:
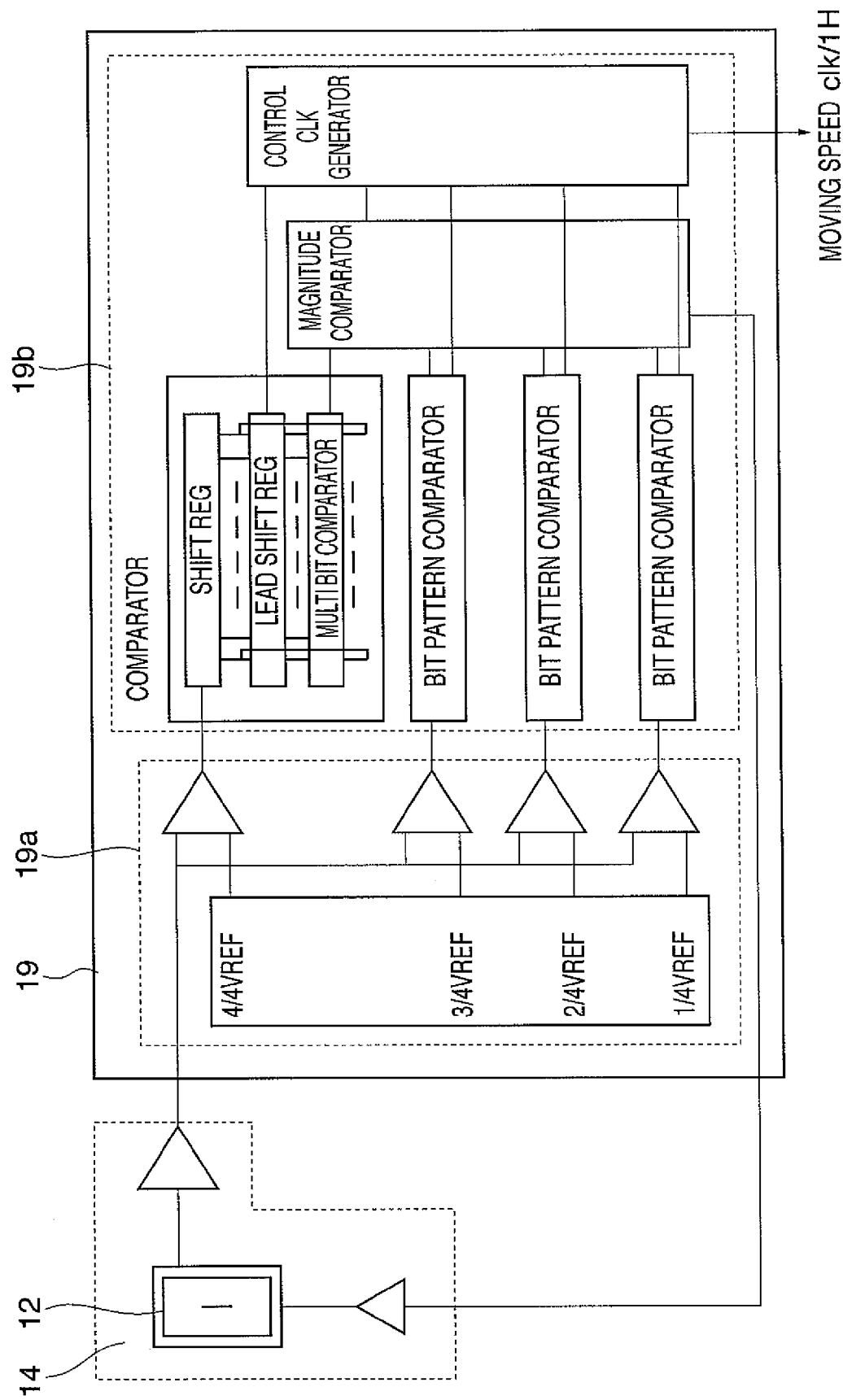
FIG. 3 is a schematic block diagram of an example of the construction of a displacement detecting circuit of the image forming apparatus in FIG. 1.

FIG. 3 is a schematic block diagram of an example of the construction of the displacement detecting circuit 19. The displacement detecting circuit 19 is hardware that is comprised of a serial register 19a and a comparator 19b and realizes a pattern tracing function. The displacement detecting circuit 19 has the capability to track a specific pattern in speckle patterns on the surface of the photosensitive drum 1 detected at intervals of a predetermined sampling period while counting time.

Specifically, in predetermined sampling timing, the displacement detecting circuit 19 detects a distinctive pattern using a labeling method or the like from a speckle pattern on the surface of the photosensitive drum 1 detected by the CCD sensor 12. The displacement detecting circuit 19 then detects the distinctive pattern from the speckle pattern detected one period after the above-mentioned predetermined timing. The displacement detecting circuit 19 then compares these two speckle patterns to calculate the movement amount of the distinctive pattern and calculates the moving speed of the distinctive pattern, i.e. the moving speed of the surface of the photosensitive drum 1 based on the calculated movement amount and the sampling period. It should be noted that, for example, methods described in Japanese Laid-Open Patent Publication (Kokai) Nos. H05-18714 and H05-52517 may also be used for the displacement detecting circuit 19 to calculate the movement amount. It should be noted that although the displacement detecting circuit 19 is implemented by hardware, but the displacement detecting circuit 19 may be implemented by software computations performed by the CPU 18. Also, the displacement detecting circuit 19 should not necessarily calculate the moving speed of the surface of the photosensitive drum 1 by comparing two speckle patterns as described above, but may calculate the moving speeds of the surface of the photosensitive drum 1 by comparing a predetermined number of speckle patterns in the above described way and then average the calculated moving speeds to determine the moving speed of the surface of the photosensitive drum 1.

Then, the displacement detecting circuit 19 outputs the calculated moving speed of the surface of the photosensitive drum 1 (hereinafter merely referred to as the surface moving speed) to the CPU 18. The CPU 18 determines whether or not the surface moving speed received from the displacement detecting circuit 19 is equal to or greater than a predetermined threshold value. This threshold value is set to such a value that, when the surface moving speed is less than this value, it can be determined that the photosensitive drum 1 is not operating, or the photosensitive drum 1 is in an abnormal state since it is rotating at a low speed even though it is operating.

If determining that the calculated surface moving speed is less than the above-mentioned threshold value and hence the photosensitive drum 1 is in an abnormal state since it is rotating at a slow speed, or the photosensitive drum 1 is not moving, the CPU 18 sends a light-emission stop instruction to the laser drive circuit 9 so as to cause the laser element 8.as the speckle light source to stop the emission of light. In response to the light-emission stop instruction, the laser drive circuit 9 stops the laser element 8 to prevent unnecessary intense light from being irradiated onto the photosensitive drum 1. The CPU 18 then sends an abnormal status signal to the host apparatus, displays an error message on a display, not shown, of the image forming apparatus 100, and terminates the image-forming sequence.

On the other hand, if determining that the surface moving speed calculated by the displacement detecting circuit 19 is not less than the above-mentioned threshold value, the CPU 18 supplies rotation control voltage to the motor drive circuit 21 so as to control the rotational speed of the drum drive motor 5 so that the surface moving speed can be within a predetermined target range or a difference between the surface moving speed and a predetermined target value can be zero. The predetermined target range and the predetermined target value of the surface moving speed of the photosensitive drum 1 are set such that electrostatic latent images formed on respective main scanning lines on the photosensitive drum 1 through scanning by the scanner unit 16 have predetermined intervals in the sub scanning direction.

Also, if determining that the surface moving speed of the photosensitive drum 1 is within the target range or equal to the target value, the CPU 18 continues the image-forming sequence. Specifically, the CPU 18 requests image data of an image to be formed from the host apparatus while checking that the rotational speed of the polygon scanner 30 has reached a prescribed rotational speed by referring to a rotation detection signal from the polygon control circuit 22 and a synchronization signal from the laser scanner unit 16 is indicative of a desired value.

Upon receiving image data from the host apparatus, the CPU 18 activates the image control circuit 23, transmits the image data received from the host apparatus to the laser scanner unit 16, and causes the image control circuit 23 to instruct the laser drive circuit 26 to turn on the laser element 25. Laser light which is coherent diffused light emitted from the laser element 25 is caused to converge into parallel light by the collimator lens 27, formed into a suitable shape by the shape slit 28, and then output to the conversion lens 29. The laser light passes through the conversion lens 29, is reflected on deflection surfaces of the polygon scanner 30 to become main scanning light with a predetermined rotational angular velocity, and enters the cylindrical lens 31. The main scanning light gathered by the cylindrical lens 31 enters the f-θ lens 32, which in turn converts the rotational angular velocity so that the main scanting light can scan the main scanning line 6 of the photosensitive drum 1 at a predetermined speed. Also, the f-θ lens 32 shapes the main scanning light so that it can be a light spot with a predetermined shape on the main scanning line 6 and causes the main scanning light to finally form an image on the main scanning line 6. The main scanning light (image-forming light beam) scans the main scanning line 6 at an equiangular velocity, whereby an electrostatic latent image of one line is formed on the photosensitive drum 1. Also, when going beyond an end of the main scanning effective image area 7, the image-forming light beam scanning the main scanning line 6 at an equiangular velocity is detected by the main scanning position sensor 35 via the BD mirror 34, whereby the timing of main scanning is detected. A timing signal output from the main scanning position sensor 35 is transmitted from the image control circuit 23 to the laser drive circuit 26 via the polygon control circuit 22 to serve as a timing signal indicative of the timing of the transmission of an image signal for forming an image.

The laser scanner unit 16 scans the main scanning line 6 with laser light. Specifically, an image area where an electrostatic latent image is formed lies inside the main scanning image area 7 on the main scanning line 6 and outside an area in which a speckle pattern is formed (irradiation spot 15), and the laser scanner unit 16 scans the main scanning effective image area 7 with laser light. In the irradiation spot 15, no electrostatic latent image on the photosensitive drum 1 is developed. Process conditions for an electrostatic latent image formed in the irradiation spot 15 by irradiation of laser light from the laser element 8 are set so that no toner accumulates on the photosensitive drum 1 after development. As a result, an image formed by laser light from the laser element 8 does not constitute an output image from the image forming apparatus 100, and problems such as contamination by toner, wear of photosensitive drum 1 can be prevented, wear of a developer can be prevented.

As described above, in the image forming apparatus 100 according to the first embodiment of the present invention, speckle patterns indicative of the surface of the photosensitive drum 1 is detected at intervals of a predetermined sampling period, and the detected speckle patterns are compared with each other to detect the movement amount of the speckle pattern at a predetermined position on the surface of the photosensitive drum 1. The moving speed of the surface of the photosensitive drum 1 is calculated based on the movement amount of the speckle pattern at the predetermined position and the sampling period, and the rotational speed of the photosensitive drum 1 is controlled so that the calculated moving speed of the surface of the photosensitive drum 1 can be equal to a target value. As a result, the position at which an electrostatic latent image is formed can be controlled by controlling the rotational speed of the photosensitive drum 1 according to the moving speed of the surface of the photosensitive drum 1. Thus, even in a case where the surface of the photosensitive drum 1 deflects from the rotation axis of the photosensitive drum 1 or in a case where the surface of the photosensitive drum 1 itself is distorted, a minute change in the moving speed of the surface of the photosensitive drum 1 caused by such a deflection or distortion can be detected. By suitably controlling the rotational speed of the photosensitive drum 1 in response to the detected minute change in the moving speed of the surface of the photosensitive drum 1, it is possible to form an even image while maintaining high resolution.

Next, a description will be given of an image forming apparatus according to a second embodiment of the present invention.

Figure 4:
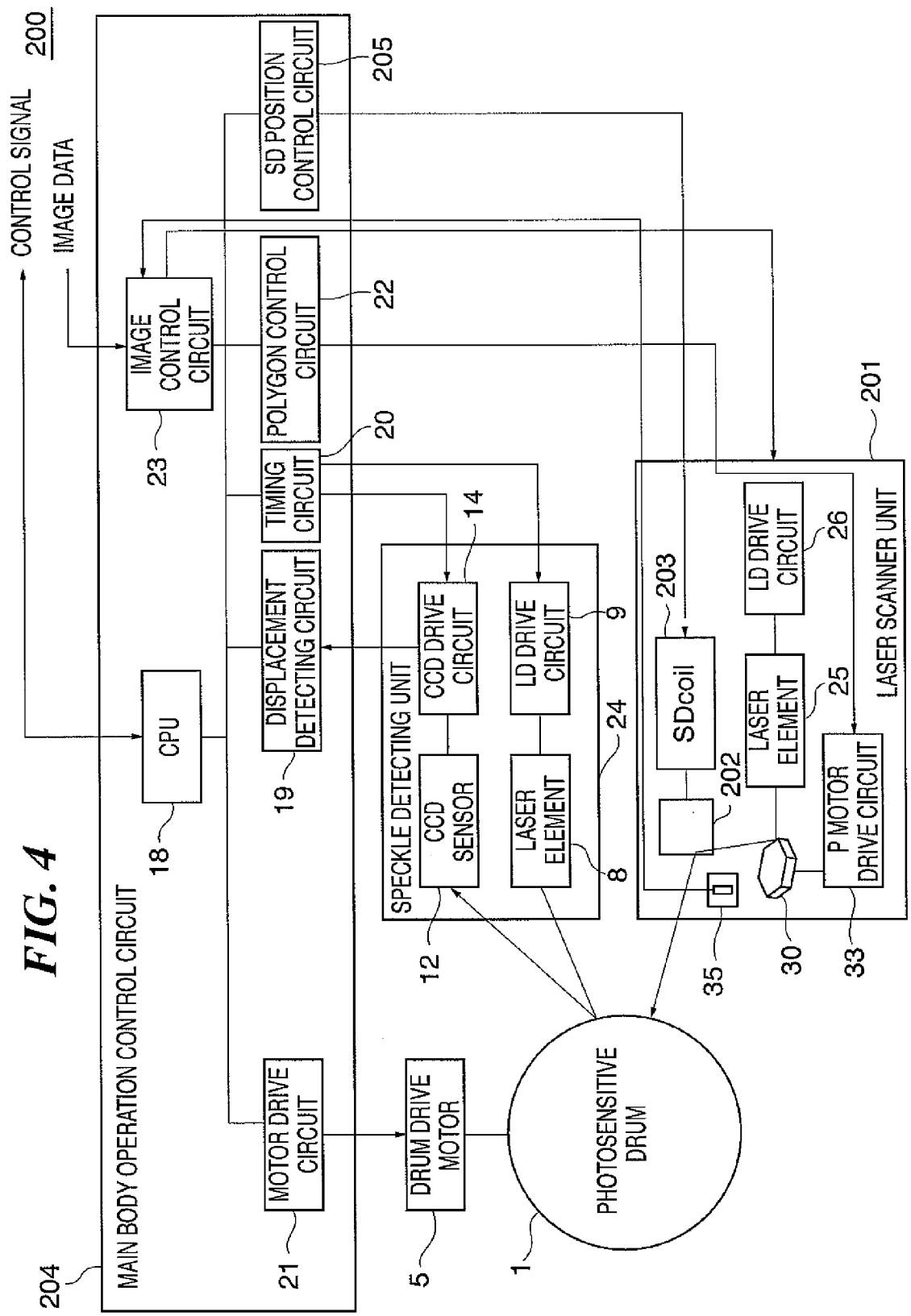
FIG. 4 is a schematic block diagram of the construction of an image forming apparatus according to a second embodiment of the present invention.
Figure 5:
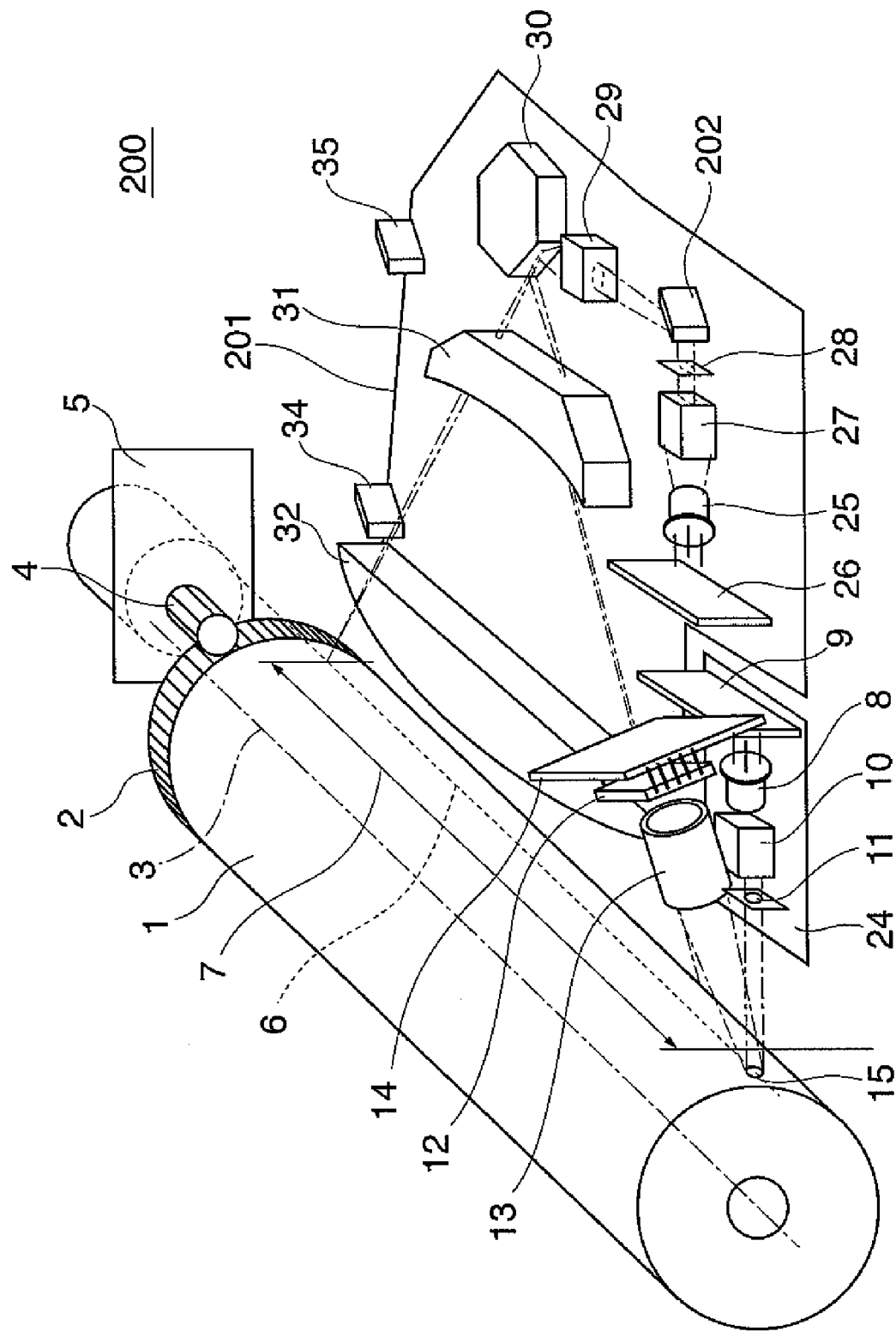
FIG. 5 is a partial perspective view of the essential parts of the image forming apparatus in FIG. 4.

FIG. 4 is a schematic block diagram of the construction of the image forming apparatus 200 according to the second embodiment. FIG. 5 is a partial perspective view of the essential parts of the image forming apparatus 200.

The image forming apparatus 200 according to the second embodiment differs from the image forming apparatus 100 according to the above described first embodiment in the constructions of the laser scanner unit and the main body operation control circuit. In the following description, elements and parts corresponding to those of the image forming apparatus 100 according to the above described first embodiment are denoted by the same reference numerals, and description is omitted and only differences are described.

As shown in FIG. 5, the image forming apparatus 200 is provided with a laser scanner unit 201 in place of the laser scanner unit 16 of the image forming apparatus 100. The laser scanner unit 201 differs from the laser scanner unit 16 in the locations of the laser element 25, the laser drive circuit 26, the collimator lens 27, and the shape slit 28 and in that there is additionally provided an SD mirror 202.

As shown in FIG. 5, in the laser scanner unit 201, the laser element 25, the laser drive circuit 26, the collimator lens 27, and the shape slit 28 are arranged such that their optical axes cross the optical axis of the cylindrical lens 29 at a predetermined angle such as 90°.

The SD mirror 202 is disposed such that its photo-receptive surface is located at a point of intersection of the optical axes of the collimator lens 27 and the shape slit 28 and the optical axis of the cylindrical lens 29. The SD mirror 202 causes laser light received from the collimator lens 27 via the shape slit 28 to enter the cylindrical lens 29. Also, the SD mirror 202 is configured such that the angle of its photo-receptive surface is changeable by an SD coil 203, described later, so that the position at which received laser light enters the cylindrical lens 29 can be changed. Specifically, the SD mirror 202 deflects the reflecting direction of laser light so that the position at which the laser light enters the cylindrical lens 29 can be shifted in a vertical direction. That is, the position of the main scanning line 6 of the photosensitive drum onto which an image-forming light beam is irradiated can be shifted parallel in a vertical direction.

As shown in FIG. 4, the laser scanner unit 201 is provided with the SD coil 203 for driving the SD mirror 202. The SD coil 203 drives the SD mirror 202 to change the angle of the photo-receptive surface thereof as described above.

As shown in FIG. 4, the image forming apparatus 200 is also comprised of a main body operation control circuit 204 in place of the main body operation control circuit 17 of the image forming apparatus 100. The main body operation control circuit 204 differs from the main body operation control circuit 17 in that there is additionally provided an SD position control circuit 205 which controls the SD coil 203.

In the main body operation control circuit 204, the CPU 18 adjusts the rotational speed of the drum drive motor 5 by controlling the motor drive circuit 21 according to the surface moving speed of the photosensitive drum 1 calculated by the displacement detecting circuit 19 as described above, whereby the rotational speed, i.e. the surface moving speed of the photosensitive drum 1 is controlled to a suitable speed. Also, in the main body operation control circuit 204, the CPU 18 adjusts the angle of the photo-receptive surface of the SD mirror 202 by controlling the SD position control circuit 205 (optical path control unit) according to the surface moving speed of the photosensitive drum 1 calculated by the displacement detecting circuit 19. That is, the SD position control circuit 205 drives the SD mirror 202 such that an image-forming light beam scans the photosensitive drum 1 at a suitable position thereof to form an electrostatic latent image at a suitable position.

A description will now be given of the operation of the image forming apparatus 200 constructed as described above.

Upon receiving an image formation instruction signal that instructs the formation of an image from the host apparatus, the CPU 18 of the main body operation control circuit 204 controls associated component elements as is the case with the image forming apparatus 100 described above. Specifically, the speckle detecting unit 24 detects speckle patterns on the surface of the photosensitive drum 1 at intervals of the above-mentioned sampling period, and the displacement detecting circuit 19 calculates the surface moving speed of the photosensitive drum 1 from the detected speckle patterns. Then, in accordance with the surface moving speed of the photosensitive drum 1 calculated by the displacement detecting circuit 19, the motor drive circuit 21 controls the drum drive motor 5 to adjust the surface moving speed of the photosensitive drum 1 to a suitable speed.

Then, upon receiving image data from the host apparatus, the CPU 18 causes the laser scanner unit 16 to scan the photosensitive drum 1 by exposing it to an image-forming light beam in response to an image forming signal of the image data, whereby an electrostatic latent image of the designated image is formed in the main scanning effective image area 7 of the photosensitive drum 1. At this time, laser light output from the laser element 26 enters the SD mirror 202 via the collimator lens 27 and the shape slit 28. The collimator lens 27 adapts the laser light bundle, which has become coherent parallel light, to the shape of an opening of the SD mirror 202, and the SD mirror 202 reflects the coherent laser light bundle having passed through the shape slit 28 according to the laws of optics. The reflected light from the SD mirror 202 is caused to converge in the sub scanning direction and the main scanning direction and irradiated onto the polygon scanner 30 by the cylindrical lens 29. Then, as is the case with the scanner unit 16, the image-formation light scans the photosensitive drum 1 via the cylindrical lens 31 and the f-θ lens 32.

Further, in the image forming apparatus 200 according to the present embodiment, upon starting an image-formation sequence, the CPU 18 controls the drum drive motor 5 according to the calculated surface moving speed as described above and also controls the SD position control circuit 205 according to the calculated surface moving speed. Specifically, upon starting an image-formation sequence, the CPU 18 reads the surface moving speed of the photosensitive drum 1 calculated by the displacement detecting circuit 19. The CPU 18 then causes the motor drive circuit 21 to control the drum drive motor 5 so that the surface moving speed can be within a target range. The CPU 18 does not only controls the drum drive motor 5 but also controls the SD position control circuit 205 at the same time so as to adjust the position of an image-formation light beam in the sub scanning direction, which scans the photosensitive drum 1. A concrete description will now be given of the operation of the SD position control circuit 205.

When the CPU 18 starts an image-formation sequence, speckle pattern data of speckle patterns on the surface of the photosensitive drum 1 (irradiation spot 15) detected by the laser speckle detecting unit 24 at intervals of the above-mentioned predetermined sampling period is transmitted to the displacement detecting circuit 19. The displacement detecting circuit 19 calculates the surface moving speed of the photosensitive drum 1 from the received speckle pattern data and transmits the calculation result to the CPU 18 as described above. In accordance with the calculated surface moving speed, the CPU 18 controls the motor drive circuit 21 to adjust the rotational speed of the drum drive motor 5 so that the rotational speed of the photosensitive drum 1 can be equal to a target value. That is, the pitch widths of main scanning lines on the photosensitive drum 1 in the sub scanning direction are kept within a predetermined range.

The CPU 18 controls the SD position control circuit 205 as well as the motor drive circuit 21 at the same time in accordance with the calculated surface moving speed to control the SD coil 203 so as to adjust the angle of the photo-receptive surface of the SD mirror 202. That is, the absolute position of the main scanning line 6 on the photosensitive drum 1 in the sub scanning direction is adjusted. At this time, taking into consideration the amount of adjustment of the surface moving speed of the photosensitive drum 1 under the control of the motor drive circuit 21, the CPU 18 adjusts the absolute position of the main scanning line 6 on the photosensitive drum 1 in the sub scanning direction so that the pitch widths of main scanning lines on the photosensitive drum 1 in the sub scanning direction can be within a predetermined range.

The CPU 18 calculates the controlled amount of the surface moving speed of the photosensitive drum 1 and the controlled amount of the SD mirror 202 according to a sharing ratio set in advance so that the pitch width of the main scanning line 6 on the photosensitive drum 1 in the sub scanning direction can be within a predetermined range and outputs the calculated amounts to the drum drive motors 5 and the SD coil 203. For example, the CPU 18 detects the cycle of variation in the surface moving speed from the surface moving speed of the photosensitive drum 1 calculated by the displacement detecting circuit 19. If the surface moving speed varies in a cycle in a low-frequency range, the CPU 18 controls the motor drive circuit 21 so that the surface moving speed output from the displacement detecting circuit 19 can be equal to the above-mentioned target value. On the other hand, if the surface moving speed varies in a cycle in a high-frequency range, the CPU 18 controls the SD position control circuit 205 so as to control the deflection angle of the SD mirror 202 so that variations in the pitch widths of the main scanning lines 6 in the sub scanning direction of an electrostatic latent image formed on the photosensitive drum 1 can be within a predetermined range.

Since the surface moving speed of the photosensitive drum 1 and the angle of the photo-receptive surface of the SD mirror 202 are controlled as described above, the pitch widths of main scanning lines in the sub scanning direction of an electrostatic latent image formed on the photosensitive drum 1 can be uniform.

As described above, in the image forming apparatus 200 according to the second embodiment of the present invention, speckle patterns indicative of the surface of the photosensitive drum 1 are detected at intervals of a predetermined sampling period, and the detected speckle patterns are compared with each other to detect the movement amount of the speckle pattern on the surface of the photosensitive drum 1. The moving speed of the surface of the photosensitive drum 1 is then calculated based on the movement amount of the speckle pattern and the sampling period, and the rotational speed of the photosensitive drum 1 is controlled so that the calculated moving speed of the surface of the photosensitive drum 1 can be equal to a target value. In addition, the absolute position of the main scanning line 6 of an image-forming light beam on the photosensitive drum 1 in the sub scanning direction is controlled so that the pitch widths of main scanning lines in the sub scanning direction of an electrostatic latent image formed on the photosensitive drum 1 can be uniform. As a result, even in a case where the surface of the photosensitive drum 1 deflects from the rotation axis of the photosensitive drum 1 or in a case where the surface of the photosensitive drum 1 is distorted, the pitch widths of main scanning lines in the sub scanning direction of an electrostatic latent image formed on the photosensitive drum 1 can be uniform. Thus, an even image can be formed while maintaining higher resolution.

It should be noted that although in the present embodiment, the rotational speed of the photosensitive drum 1 and the deflection angle of the SD mirror 202 are controlled according to the calculated surface moving speed of the photosensitive drum 1, this is not limitative, but only the deflection angle of the SD mirror 202 may be controlled according to the calculated surface moving speed of the photosensitive drum 1.

Figure 6:
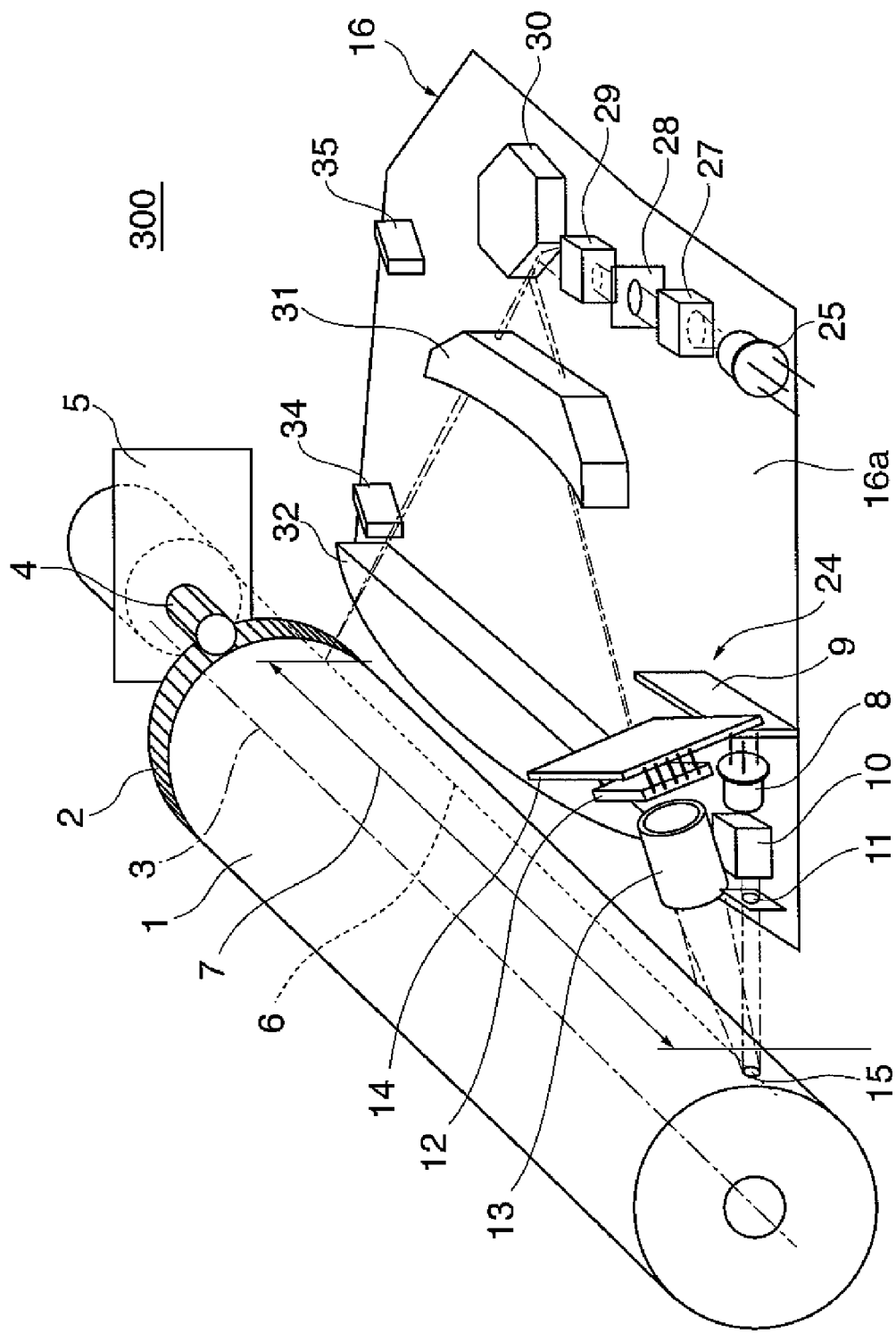
FIG. 6 is a perspective view of the essential parts of an image forming apparatus according to a third embodiment of the present invention.

Next, a description will be given of an image forming apparatus according to a third embodiment of the present invention. FIG. 6 is a perspective view of the essential parts of the image forming apparatus 300 according to the third embodiment.

As shown in FIG. 6, the image forming apparatus 300 according to the present embodiment differs from the image forming apparatus 100 according to the above described first embodiment only in that the speckle detecting unit 24 is disposed inside the laser scanner unit 16. Specifically, the laser element 8, laser drive circuit 9, collimator lens 10, shape slit 11, CCD sensor 12, image-forming lens 13, and CCD drive circuit 14 of the speckle detecting unit 24 are configured as an integral unit on a substrate 16a of the laser scanner unit 16 as shown in FIG. 6.

Although the image forming apparatus 300 according to the present embodiment is constructed such that the speckle detecting unit 24 is disposed in the laser scanner unit 16 of the image forming apparatus 100 according to the first embodiment described above, this is not limitative. The image forming apparatus 300 according to the present embodiment may be constructed such that the speckle detecting unit 24 is disposed in the laser scanner unit 201 of the image forming apparatus 200 according to the above described second embodiment.

By disposing the speckle detecting unit 24 in the laser scanner unit 16 or 201, the physical relative positions of the speckle detecting unit 24 and the laser scanner unit 16 or 201 can be fixed. As a result, the movement amount of a speckle pattern on the surface of the photosensitive drum 1 includes a disturbance vibration occurring on the laser scanner unit 16 or the like. For this reason, by controlling the drum drive motor 5 which is means for controlling the rotational speed of the photosensitive drum 1, variations in the pitch widths of main scanning lines in the sub scanning direction of an electrostatic latent image formed on the photosensitive drum 1 can be minimized. Thus, an even image can be formed while maintaining higher resolution.

Next, a description will be given of an image forming apparatus according to a fourth embodiment of the present invention.

The image forming apparatus according to the fourth embodiment differs from the image forming apparatuses according to the above described first to third embodiments in that the laser element of the speckle detecting unit is removed, and the laser element of the laser scanner unit doubles as a laser element of the speckle detecting unit.

A description will now be given of an example of the image forming apparatus according to the present embodiment.

Figure 7:
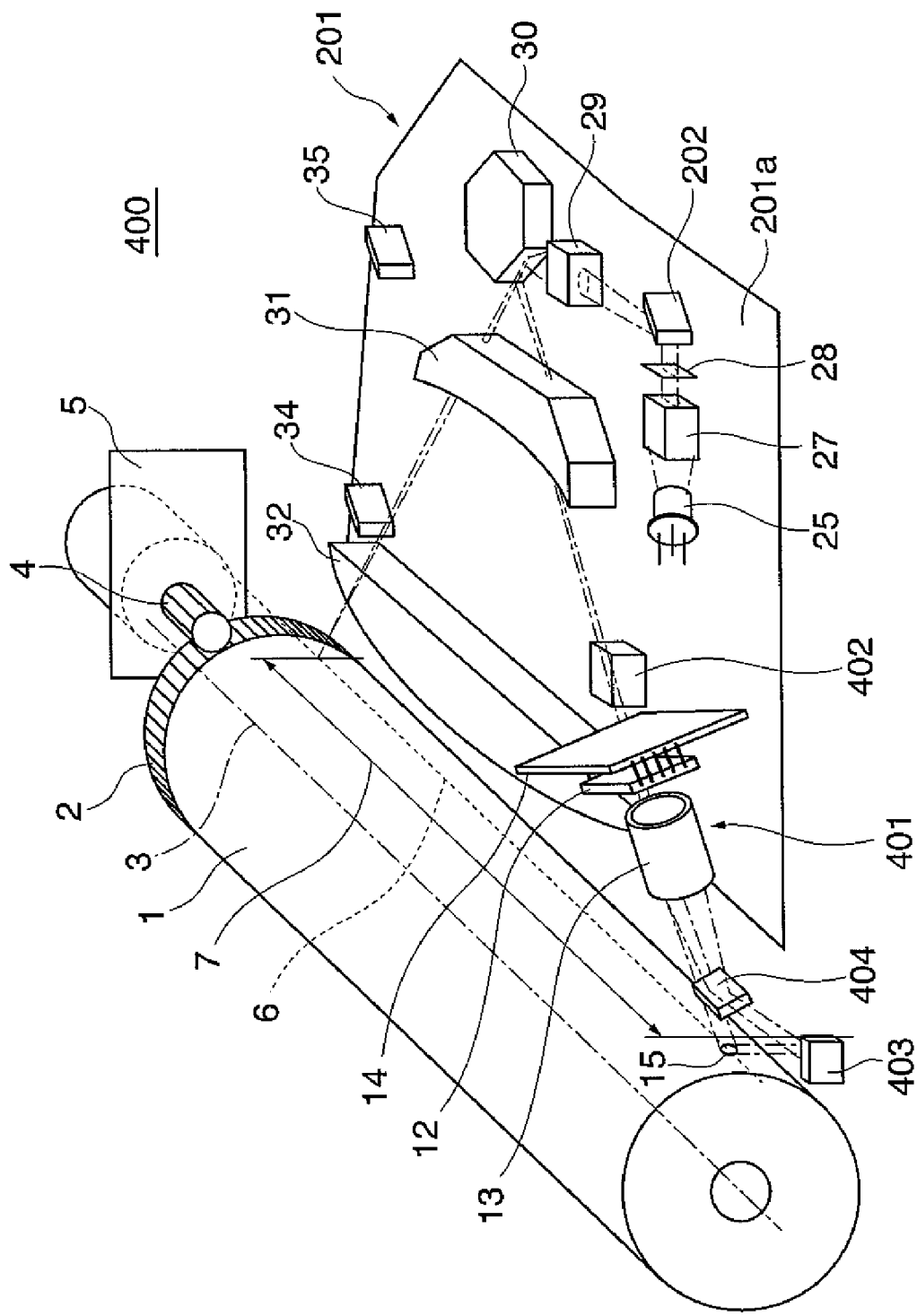
FIG. 7 is a perspective view of the essential parts of an image forming apparatus according to a fourth embodiment of the present invention.

FIG. 7 is a perspective view of the essential parts of the image forming apparatus 400 according to the present embodiment. The image forming apparatus 400 differs from the image forming apparatus 200 according to the above described second embodiment in that the speckle detecting unit is disposed in the laser scanner unit, and the laser element of the laser scanner unit doubles as a laser element of the speckle detecting unit. In the following description, elements and parts corresponding to those of the image forming apparatus 200 according to the second embodiment are denoted by the same reference numerals, and description thereof is omitted and only differences are described.

As shown in FIG. 7, the image forming apparatus 400 is constructed such that the speckle detecting unit 401 is integrally constructed on a substrate 201a of the laser scanner unit 401. The speckle detecting unit 401 is not provided with the laser element 8, the laser drive circuit 9, the collimator lens 10, and the shape slit 11 of the speckle detecting unit 24 of the image forming apparatus 200. In the image forming apparatus 400, the speckle detecting unit 401 and the scanner detecting unit 201 share the laser element 25, the laser drive circuit 26, the collimator lens 27, the shape slit 28, the SD mirror 202, the cylindrical lens 29, the polygon scanner 30, the cylindrical lens 31, and the f-θ lens 32. Specifically, the speckle detecting unit 401 detects reflected light of main scanning light, which is irradiated onto the photosensitive drum 1 by the scanner unit 201, to detect a speckle pattern on the surface of the photosensitive drum 1.

Accordingly, the speckle detecting unit 401 is provided with a second collimator lens 402, a pickup mirror 403, and a reflection mirror 404 as shown in FIG. 7.

The second collimator lens 402 is provided on an optical path of laser light in the vicinity of the f-θ lens 32 and converts a laser light beam from the cylindrical lens 31 into parallel light again. Also, the second collimator lens 402 is disposed at such a location that laser light passing through the second collimator lens 402 irradiates an area outside the main scanning effective image area 7 of the photosensitive drum 1. Thus, an electrostatic latent image to be formed has no chip or the like.

The pickup mirror 403 and the reflection mirror 404 are for guiding reflected light of laser light irradiated onto the photosensitive drum 402 via the second collimator lens 402 to the image-forming lens 13.

In the speckle detecting unit 401, the second collimator lens 402 converts main scanning light from the laser element 25 of the scanner unit 201 into parallel light and irradiates the main scanning light onto the irradiation spot 15 of the photosensitive drum 1. The pickup mirror 403 then picks up reflected light of the laser light irradiated onto the irradiation spot 15 of the photosensitive drum 1 and guides the picked-up laser light to the reflection mirror 404. The reflection mirror 404 then guides the laser light to the image-forming lens 13, whereby an image of a speckle pattern on the surface of the photosensitive drum 1 in the irradiation spot 15 is formed on the photo-receptive surface of the CCD sensor 12.

In the image forming apparatus 400 according to the present embodiment, a speckle pattern including the accuracy of each reflection surface of the polygon scanner 30 is detected by the CCD sensor 12. The image forming apparatus 400 has no particular light source for generating a speckle pattern and is configured to generate a speckle pattern by means of a writing beam itself irradiated onto the photosensitive drum 1. To form a beam spot with high accuracy at a desired position on the photosensitive drum 1, it is necessary to detect the relative behaviors of a beam spot and an image writing position on the photosensitive drum. In the image forming apparatuses in FIGS. 2, 5, and 6, the speckle pattern-generating laser element is provided at the location different from the location of the image-writing laser element and is supported by the member different from the member supporting the image-writing laser element, a beam spot and an image writing position are differently affected by (pick up) mechanical vibrations because of the differences in position and supporting member between the speckle pattern-generating laser element and the image-forming laser element. If a speckle pattern is detected with this arrangement, there is a possibility that the behavior of a beam spot is different from the behavior of an image writing position. The image forming apparatus in FIG. 7 aims to prevent degradation in accuracy caused by such a difference in detected positions. For example, in the image forming apparatus in FIG. 7, in a case where the photosensitive drum 1 and the image-writing laser element are under the same vibrations, the relative shift of a speckle pattern is constant insofar as the photosensitive drum 1 and the image-writing laser element are vibrated in the same direction and by the same amount, and hence a system capable of canceling the effects of the vibrations may be constructed. Therefore, by controlling the drum drive motor 5 which is means for controlling the rotational speed of the photosensitive drum 1, or the SD mirror 202 which is means for controlling the optical path of laser light to be irradiated onto the photosensitive drum 1, variations in the pitch widths of main scanning lines in the sub scanning direction of an electrostatic latent image formed on the photosensitive drum 1 can be minimized. Therefore, an even image can be formed while maintaining higher resolution.

It is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and the storage medium in which the program code is stored constitute the present invention.

Examples of the storage medium for supplying the program code include a floppy (registered trademark) disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2006-116514 filed Apr. 20, 2006, which is hereby incorporated by reference herein in its entirety.

What is claimed is:

1. An image forming apparatus comprising:
an image bearing member;
a speckle pattern detecting unit adapted to detect a speckle pattern on a surface of said image bearing member; and
a drive control unit adapted to control a rotational speed of said image bearing member based on the speckle pattern on the surface of said image bearing member detected by said speckle pattern detecting unit.

2. An image forming apparatus according to claim 1, further comprising a laser scanner adapted to irradiate a laser beam in a main scanning direction onto the surface of said image bearing member and expose the surface of said image bearing member to the laser beam to form an electrostatic latent image, and a movement amount detecting unit adapted to detect a movement amount of the speckle pattern detected by said speckle pattern detecting unit,
wherein said drive control unit is adapted to control the rotational speed of said image bearing member according to the movement amount of the speckle pattern detected by said movement amount detecting unit.

3. An image forming apparatus according to claim 2, further comprising an optical path control unit adapted to control an optical path of the laser beam according to the movement amount of the speckle pattern detected by said movement amount detecting unit.

4. An image forming apparatus according to claim 2, wherein said speckle pattern detecting unit is disposed outside said laser scanner.

5. An image forming apparatus according to claim 2, wherein said speckle pattern detecting unit is disposed inside said laser scanner.

6. An image forming apparatus according to claim 2, wherein the speckle pattern on the surface of said image bearing member detected by said speckle pattern detecting unit is formed by the laser beam irradiated by said laser scanner.

7. An image forming apparatus according to claim 1, wherein the speckle pattern on the surface of said image bearing member comprises a speckle pattern in a non-image area or non-development area of said image bearing member.

8. An image forming method comprising:
a speckle pattern detecting step of detecting a speckle pattern on a surface of an image bearing member; and
a drive control step of controlling a rotational speed of the image bearing member based on the speckle pattern on the surface of the image bearing member detected in said speckle pattern detecting step.

9. An image forming method according to claim 8, further comprising a laser scanning step of irradiating a laser beam in a main scanning direction onto the surface of the image bearing member and exposing the surface of the image bearing member to the laser beam to form an electrostatic latent image, and a movement amount detecting step of detecting a movement amount of the speckle pattern detected in said speckle pattern detecting step,
wherein, in said drive control step, the rotational speed of said image bearing member is controlled according to the movement amount of the speckle pattern detected in said movement amount detecting step.

10. An image forming method according to claim 9, further comprising an optical path control step of controlling an optical path of the laser beam according to the movement amount of the speckle pattern detected in said movement amount detecting step.

11. An image forming method according to claim 9, wherein the speckle pattern on the surface of the image bearing member detected in said speckle pattern detecting step is formed by the laser beam irradiated in said laser scanning step.

12. An image forming method according to claim 8, wherein the speckle pattern on the surface of the image bearing member comprises a speckle pattern in a non-image area or non-development area of the image bearing member.

* * * * *